Patented Aug. 12, 1941

2,252,366

UNITED STATES PATENT OFFICE 2,252,366

CONDENSATION PRODUCT CONTAINING SULPHUR

Walter Frost, Saarau, Kreis Schweidnitz, Germany, assignor to the firm Silesia Verein Chemischer Fabriken, Saarau, Kreis Schweidnitz, Germany No Drawing. Application January 13, 1939, Serial No. 250,759. In Germany February 1, 1938

8 Claims. (Cl. 260—79)

This invention relates to condensation products containing sulphur and it has particular relation to plastic condensation products which are obtained by causing to react polysulphides with organic compounds capable of reacting at least at two linkages with polysulphides.

According to my present invention improved condensation products of high molecular weight can be obtained by carrying out the condensation between polysulphides and the above mentioned organic compounds in the presence of an organic compound containing only one negative group or an organic compound which contains only one negative group, and which, moreover, is substituted by another non-negative group or groups.

It is known in the art that caoutchouc-like condensation products may be obtained by causing to react polysulphides of alkaline metals, alkaline-earth metals or ammonium, with dihalogenated organic compounds, or other organic compounds which are capable of reacting with polysulphides at least at two linkages. Such condensation products may, for instance, be obtained from polysulphides and dihalogenated aliphatic hydrocarbons, mixed aromatic hydrocarbons having at least two halogen atoms in side chains, dihalogenated ethers, ethyl-dithiosulphuric acids, ethyldimercaptans, or aldehydes.

Caoutchouc-like condensation products thus obtained show a marked resistance towards oils and numerous organic solvents, which strongly attack natural rubber, and they have been applied to numerous purposes in the art.

It is further known that these condensation products can be prepared in a finely divided state, for instance in the form of an aqueous suspension, by carrying out the reaction between polysulphides and the above mentioned organic compounds in the presence of dispersing agents and protective colloids. The suspension thus obtained is usually washed out, and coagulated with acid. The coagulated product is then sheeted on rolls, and is further worked up by methods similar to those used in working up natural rubber.

The plastic and elastic products obtained according to the known methods, show properties which are similar to those of natural rubber. In these known processes it is possible to adjust to a limited extent only the quality of the condensation products by varying the working conditions of the condensation process. The aim is to attain the higher condensation grades of plastic and elastic products, and it is, therefore, in these processes necessary to advance the reaction beyond the lower grades of condensation at which oily, resinous, or smeary products are partly obtained. The properties of these plastic and elastic products obtained by these processes are fixed by the degree of the condensation. It has been observed that these products meet with the requirements as regards plasticity and elasticity, but they often have lost some other properties which are also of great value for various technical uses. Among such properties, as an example, stickiness may be mentioned, the grade of which generally decreases in the same proportion, as plasticity and elasticity increase, as the condensation proceeds.

I have discovered that condensation products of high molecular weight and of any desired degree of stickiness can be obtained by proceeding as follows:

An aqueous solution of a polysulphide is caused to react with a dihalogenated organic compound or other organic compounds, which are capable of reacting with polysulphides at least at two linkages, in the presence of small amounts of an organic compound containing only one negative group, or an organic compound which contains only one negative group, and which, moreover, is substituted by another non-negative group or groups. Such organic compounds are, for example, monohalogen derivatives of hydrocarbons, such as ethyl chloride, ethyl bromide, benzyl chloride; acid chlorides, such as acetyl chloride, or benzoyl chloride; acid anhydrides, such as acetic anhydride; easily reacting esters, for instance methyl sulphate; organic acids, for example, acetic acid; compounds containing a mercaptan-group or a thiosulphuric acid group.

The softness and particularly the adhesive power of the resulting condensation products can be adjusted to any desired grade by correspondingly fixing the amount of the above mentioned additions.

Thus, for instance, by causing to react ethylene chloride with a solution of sodium tetrasulphide in the presence of 5 mol-% of ethyl bromide, the suspension of a condensation product can be obtained, which by coagulation yields a soft, sticky resin. By carrying out the same reaction in the presence of 0.5–1.0 mol-% of ethyl bromide, a suspension results which yields a coagulated product which also shows distinct stickiness but a correspondingly decreased softness. By adding less than 0.5% ethyl bromide a further decrease of the adhesive power and of softness occurs, and the products obtained approach as regards their properties the known condensation products which are obtained without any addition of ethyl bromide. Thus I prefer to use the above mentioned additions or mixtures of these additions in a quantity varying from 0.5 to 5 mol-%.

*Example 1.*—A mixture of 1 kilogram of ethylene chloride and 3.2 grams of ethyl chloride or 5.45 grams of ethyl bromide, is caused to react in a manner known per se, for instance at 70° C., with an aqueous solution of 1.740 kilograms of sodium tetrasulphide in the presence of 60 grams of freshly precipitated magnesium hydroxide. A sodium tetrasulphide solution having a specific gravity of 1.2 to 1.3 may be used. The ethylene dichloride is preferably added in small proportions with vigorous agitation, and the condensation product is formed as a fluid dispersion which settles out of the reaction mixture. The suspension obtained is washed out, and is coagulated with acid in a known manner, whereby a plastic product of good adhesive power is obtained.

*Example 2.*—An aqueous solution of 1.740 kilograms of sodium tetrasulphide, having a specific gravity of 1.2 to 1.3 is caused to react in the manner described in Example 1, with a mixture of 1 kilogram of ethylene chloride and 11 grams of ethyl bromide in the presence of 60 grams of freshly precipitated magnesium hydroxide. The resulting suspension is washed out. The condensation product obtained from this suspension in a known manner by coagulation with an acid, shows good adhesive properties and a fast adherence to articles of any material to which it has been applied in a suitable manner.

*Example 3.*—1 kilogram of ethylene chloride and 12.6 grams of benzyl chloride are caused to react in the presence of magnesium hydroxide with 1.740 kilograms of sodium tetrasulphide dissolved in water, and worked up as described in Example 1. The properties of the coagulated product are similar to those obtained according to Example 1.

*Example 4.*—1 kilogram of ethylene chloride to which 12.6 grams of methyl sulphate have been added, yields when caused to react with an aqueous solution of 1.740 kilograms of sodium tetrasulphide in the presence of magnesium hydroxide, and worked up as described in Example 1, a product similar to that obtained according to Example 2.

*Example 5.*—1 kilogram of ethylene chloride to which 10.2 grams of acetic anhydride or 10.4 grams of benzoyl chloride have been added, yields when reacted with an aqueous solution of 1.740 kilograms of sodium tetrasulphide in the presence of magnesium hydroxide, and worked up as described in Example 1, a product corresponding to that obtained in accordance with Example 2.

*Example 6.*—1 kilogram of ethylene chloride to which 50 grams of glacial acetic acid have been added yields when caused to react with 1.740 kilograms of sodium tetrasulphide in the presence of magnesium hydroxide, and worked up as described in Example 1, a product similar to that obtained according to said example.

For carrying out my present invention instead of sodium tetrasulphide other polysulphides of alkaline metals, alkaline-earth metals or ammonium, and instead of ethylene chloride other dihalogenated organic compounds or other organic compounds which are capable of reacting with polysulphides at least at two linkages, may be employed. Thus, for instance, the organic compounds mentioned in paragraph 3 of the present specification may be used. Mixtures of several polysulphides, and mixtures of several organic compounds may also be used. The term "mol-%" is applied in my present specification and claims to the percentage in relation to the molecular weight of a compound. Thus, for instance, "5 mol-%" denotes 5% of the molecular weight. Instead of magnesium hydroxide another finely divided basic compound of a metal of the alkaline earth group, such as hydroxides of calcium or barium, or their carbonates, or protective colloids, such as alkyl cellulose or gelatin, may be used. The magnesium hydroxide or equivalent substance may also be omitted in carrying out the reaction. Magnesium hydroxide or the like may be formed by precipitation in the polysulphide solution or a magnesium hydroxide suspension may be formed separately, and added to the polysulphide solution. The condensation product is formed according to the above examples as a fluid dispersion which settles out of the reaction mixture. The supernatant solution may be removed by decantation, and the dispersion may be washed with water. The dispersion may then be coagulated in a known manner by acidifying it with a suitable acid, such as hydrochloric acid, or organic acids, such as acetic acid.

The products obtained according to my present invention as described above, are particularly suitable as adhesive compositions, or ingredients of such compositions, and may be used alone or in mixture with fillers, such as zinc oxide or other suitable additions. The cement-like masses thus obtained, after having been applied to the surfaces to be cemented, can be preferably subjected to a heat treatment, in order to solidify the adhesive composition.

Such adhesive compositions can also be used for cementing prior to the heat treatment articles, which have been obtained from the known sulphur containing condensation products of high molecular weight which are obtained from polysulphides and dihalogenated organic compounds. By means of these adhesive compositions articles of said compensation products can be joined without heating, and they may be subjected to a heat treatment under pressure subsequently. Furthermore, grooves in linings can be sealed with such compositions, particularly if resistance towards organic liquids is required.

The condensation products according to the present invention are plastic adhesive substances of high molecular weight which may be worked up by methods similar to those used in working up natural rubber and solidified by subsequent heating. By acidifying the dispersion of same a plastic coherent composition according to the manner described may be obtained.

I claim:

1. A process of producing a condensation product containing sulfur which comprises causing to react an aqueous solution of a polysulfide selected from the group consisting of the polysulfides of alkaline metals, alkaline-earth metals, and ammonium, with an organic compound having a substituent joined to each of two different carbon atoms, which substituent is split off during the reaction, in the presence of a small amount of 0.5 to 5.0 mol-% of an organic compound selected from the group consisting of alkyl monohalides, and aralkyl monohalides.

2. A process of producing a condensation product containing sulfur, which comprises causing to react an aqueous solution of sodium tetrasulfide with ethylene chloride in the presence of a small amount of 0.5 to 5.0 mol-% of an organic compound selected from the group consisting of alkyl monohalides, and aralkyl monohalides.

3. A process of producing a condensation product containing sulfur, which comprises causing to react an aqueous solution of sodium tetrasulfide with ethylene chloride in the presence of a small amount of 0.5 to 5.0 mol-% of ethyl chloride.

4. A process of producing a condensation product containing sulfur, which comprises causing to react an aqueous solution of sodium tetrasulfide with ethylene chloride in the presence of a small amount of 0.5 to 5.0 mol-% of ethyl bromide.

5. A sticky condensation product substantially identical with that obtained by the process of claim 1.

6. A sticky condensation product substantially identical with that obtained by the process of claim 2.

7. A sticky condensation product substantially identical with that obtained by the process of claim 3.

8. A sticky condensation product substantially identical with that obtained by the process of claim 4.

WALTER FROST.